(12) United States Patent
Maheshwari et al.

(10) Patent No.: US 11,586,463 B2
(45) Date of Patent: Feb. 21, 2023

(54) AUTOMATED PROCESS FLOW LEARNING

(71) Applicant: Oracle International Corporation, Redwood Shores, CA (US)

(72) Inventors: Mudit Maheshwari, Karnataka (IN); Nitin Misra, Karnataka (IN); Shalini Krishna, Bengaluru (IN); Govindraja Achar, Karnataka (IN); Kiran Gunti, Karnataka (IN); Supriya Hegde, Bengaluru (IN); Rakshitha Gn, Karnataka (IN); Surya Moitra, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 1139 days.

(21) Appl. No.: 16/117,150

(22) Filed: Aug. 30, 2018

(65) Prior Publication Data

US 2019/0317803 A1   Oct. 17, 2019

Related U.S. Application Data

(60) Provisional application No. 62/688,460, filed on Jun. 22, 2018.

(30) Foreign Application Priority Data

Apr. 17, 2018   (IN) .............................. 201841014524

(51) Int. Cl.
*G06Q 30/00*   (2012.01)
*G06F 9/48*   (2006.01)
(Continued)

(52) U.S. Cl.
CPC .......... *G06F 9/4881* (2013.01); *G06F 16/221* (2019.01); *G06F 16/2358* (2019.01); *G06N 20/00* (2019.01); *G06Q 30/01* (2013.01)

(58) Field of Classification Search
CPC .............................. G06F 9/4881; G06Q 30/01
See application file for complete search history.

(56) References Cited

U.S. PATENT DOCUMENTS 10,616,369 B1 *   4/2020   d'Andrea .............. G06N 20/20
10,977,563 B2 *   4/2021   Ajmera ............. G06Q 30/0202
(Continued)

OTHER PUBLICATIONS

Boulton, C., What is RPA? A Revolution in Business Process Automation, 2017, ComputerWorld Hong Kong, (Year: 2017).*

(Continued)

*Primary Examiner* — Matthew L Hamilton
(74) *Attorney, Agent, or Firm* — Potomac Law Group, PLLC

(57) ABSTRACT

Embodiments perform an automated process flow using machine learning. Embodiments train a machine learning component using training data that represents a user's past interactions with a software application when performing a plurality of process flows. Each process flow includes a series of tasks in a sequence. Embodiments receive data related to tasks within the software application. Embodiments predict, using the trained machine learning component, a series of tasks and a sequence for the predicted series of tasks based on the received data. Embodiments then perform the predicted series of tasks in the predicted sequence.

20 Claims, 12 Drawing Sheets

(51) Int. Cl.
*G06N 20/00* (2019.01)
*G06F 16/22* (2019.01)
*G06F 16/23* (2019.01)
*G06Q 30/01* (2023.01)

(56) References Cited

U.S. PATENT DOCUMENTS

| | | | | |
|---|---|---|---|---|
| 11,307,879 | B2* | 4/2022 | Saimani | G06N 20/00 |
| 11,392,664 | B1* | 7/2022 | Merritt | G06F 16/955 |
| 2006/0184410 | A1 | 8/2006 | Ramamurthy et al. | |
| 2007/0162907 | A1* | 7/2007 | Herlocker | G06Q 10/10 |
| | | | | 718/100 |
| 2007/0220065 | A1* | 9/2007 | Coyle | G06F 16/217 |
| | | | | 707/999.203 |
| 2008/0177726 | A1* | 7/2008 | Forbes | G06Q 30/02 |
| | | | | 707/999.005 |
| 2010/0174583 | A1 | 7/2010 | Passova et al. | |
| 2011/0320240 | A1 | 12/2011 | Flores et al. | |
| 2012/0023504 | A1* | 1/2012 | Noam | H04L 69/04 |
| | | | | 718/105 |
| 2013/0179365 | A1 | 7/2013 | Passova et al. | |
| 2014/0129295 | A1 | 5/2014 | Band | |
| 2021/0103933 | A1* | 4/2021 | Coccia | G06Q 30/0631 |
| 2021/0107164 | A1* | 4/2021 | Singh | B25J 13/006 |
| 2021/0304064 | A1* | 9/2021 | Mudi | G06N 3/008 |
| 2021/0339389 | A1* | 11/2021 | Arcand | B25J 9/161 |

OTHER PUBLICATIONS

Krishnamurthy, K, Now, many Tech Startups use Artificial Intelligence to build Tools to ease Workflows, 2015, The Economic Times (Year: 2015).*

Unknown, "Importing Worksoft Capture Files into Certify"; Retrieved from https://docs.worksoft.com/#Worksoft%20Capture/Importing%20Worksoft%20Capture%20Files%20into%20Certify.htm on Apr. 2, 2018.

Unknown, "Importing Worksoft Capture Files into Certify"; Retrievedf from https://docs.worksoft.com/#Worksoft%20Capture/Importing%20Worksoft%20Capture%20Files%20into%20Certify.htm on Apr. 2, 2018.

Unknown, "Minit—Automated Business Process Discovery", Retrieved from https://www.minit.io/use-cases/process-discovery-process-mapping on Apr. 2, 2018.

Unknown, "UiPath Introduction" Retrieved from https://studio.uipath.com/docs/introduction on Apr. 2, 2018.

Unknown, "UiPath Studio—Desktop Automation";Retrieved from https://www.uipath.com/automate/desktop-automation on Apr. 2, 2018.

Unknown, "Using Standalone Worksoft Capture"; Retrieved from https://docs.worksoft.com/#Worksoft%20Capture/Using%20Worksoft%20Capture.htm on Apr. 2, 2018.

Unknown, "Worksoft Technology: Capture" Retrieved from https://www.worksoft.com/files/resources/Worksoft-Datasheet-Capture.pdf on Apr. 2, 2018.

Unknown; "UiPath—About Recording" Retrieved from https://studio.uipath.com/docs/about-recording on Apr. 2, 2018.

Unknown; "Worksoft Analyze", retrieved from https://www.worksoft.com/files/pdf/whitepaper/Worksoft-Datasheet-Analyze.pdf on Apr. 2, 2018.

* cited by examiner

AUTOMATED PROCESS FLOW LEARNING

CROSS REFERENCE TO RELATED APPLICATIONS

This application claims priority of U.S. Provisional Patent Application Ser. No. 62/688,460 filed on Jun. 22, 2018, the disclosure of which is hereby incorporated by reference.

FIELD

One embodiment is directed generally to a computer system, and in particular to a computer system that automates process flows of computer application functions.

BACKGROUND INFORMATION

Enterprise applications have grown into robust offerings that provide dynamic service. In some implementations, a human agent is relied upon to operate an application and follow a process flow in order to perform some function. For example, updating an item of information in a customer profile can include a multi-step process performed by an agent using a customer relationship management software application.

There have been various computer automation techniques that have attempted to address some of these concerns. However, the previously implemented techniques failed to replicate the activities of a user, and thus generated complex problems that were difficult to solve using machine learning. For example, some complex problems cannot be solved by machine learning algorithms due to a lack of training data, a problem type that is not conducive to machine prediction, or other complexity factors.

SUMMARY

Embodiments perform an automated process flow using machine learning. Embodiments train a machine learning component using training data that represents a user's past interactions with a software application when performing a plurality of process flows. Each process flow includes a series of tasks in a sequence. Embodiments receive data related to tasks within the software application. Embodiments predict, using the trained machine learning component, a series of tasks and a sequence for the predicted series of tasks based on the received data. Embodiments then perform the predicted series of tasks in the predicted sequence.

BRIEF DESCRIPTION OF THE DRAWINGS

FIG. 4 illustrates example columns of UPT data according to an example embodiment.

FIG. 5 illustrates example retrieved CRM data according to an example embodiment.

DETAILED DESCRIPTION

Embodiments can automatically recognize a sequence of process flows with relevant data in a Customer Relationship Management ("CRM") environment, or other types of applications environment. For example, actions in a CRM system can be represented by process flows with relevant data. An action can be the resolution of a service request ticket generated by a user for which a series of tasks (i.e., "process flows") are executed. In some embodiments, the process flows can be navigation tasks in an observable sequence within the CRM system that can include updating, generating, or otherwise manipulating data stored in the system.

The success of a completed process flow can be based on the identification of a successful sequence of tasks and the identification of relevant data. For example, these process flows can represent certain decisions taken by a human agent when performing various tasks.

In some implementations, the decisions at each sub-step of a process flow can be a complex amalgamations of CRM business logic exercised by the agent. At times, implementations can be complicated by the variations in the data at each sub-step, which can cause an agent to follow a different action. Using pre-existing process flows performed by the agents, embodiments can automatically recognize patterns to mimic the CRM business logic. These patterns (which can represent a learned model) can be leveraged to automatically generate a process flow. Also learned can be data relevant to each sub-step of the auto-generated process flow. Using these learned process flows and relevant data, embodiments can perform automated actions that mimic process flows in a CRM system without the need of an agent.

Figure 1:
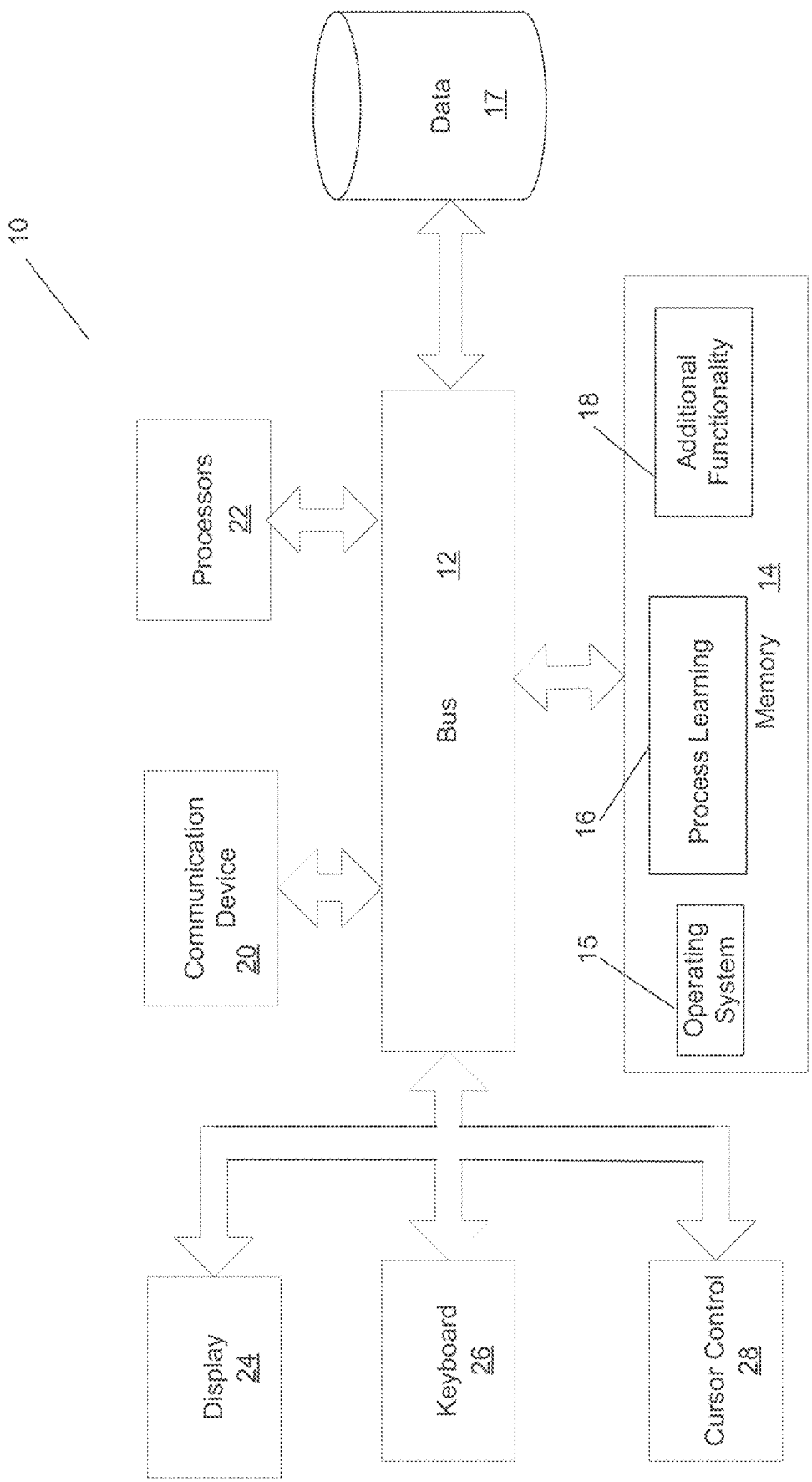
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more component of system 10 may not be included. For example, for functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include process learning module 16 for providing automated process flow learning, generation and execution, and other functionality disclosed herein. System 10 can be part of a larger system, such as a CRM system. Therefore, system 10 can include one or more additional functional modules 18 to include the additional functionality. A database 17 is coupled to bus 12 to provide centralized storage for modules 16 and 18. In one embodiment, database 17 is a relational database management system ("RDBMS") that can use Structured Query Language ("SQL") to manage the stored data. System 10, when executing modules 16 and/or 18, function as a special purpose computer that automates the generation of process flows.

Figure 2:
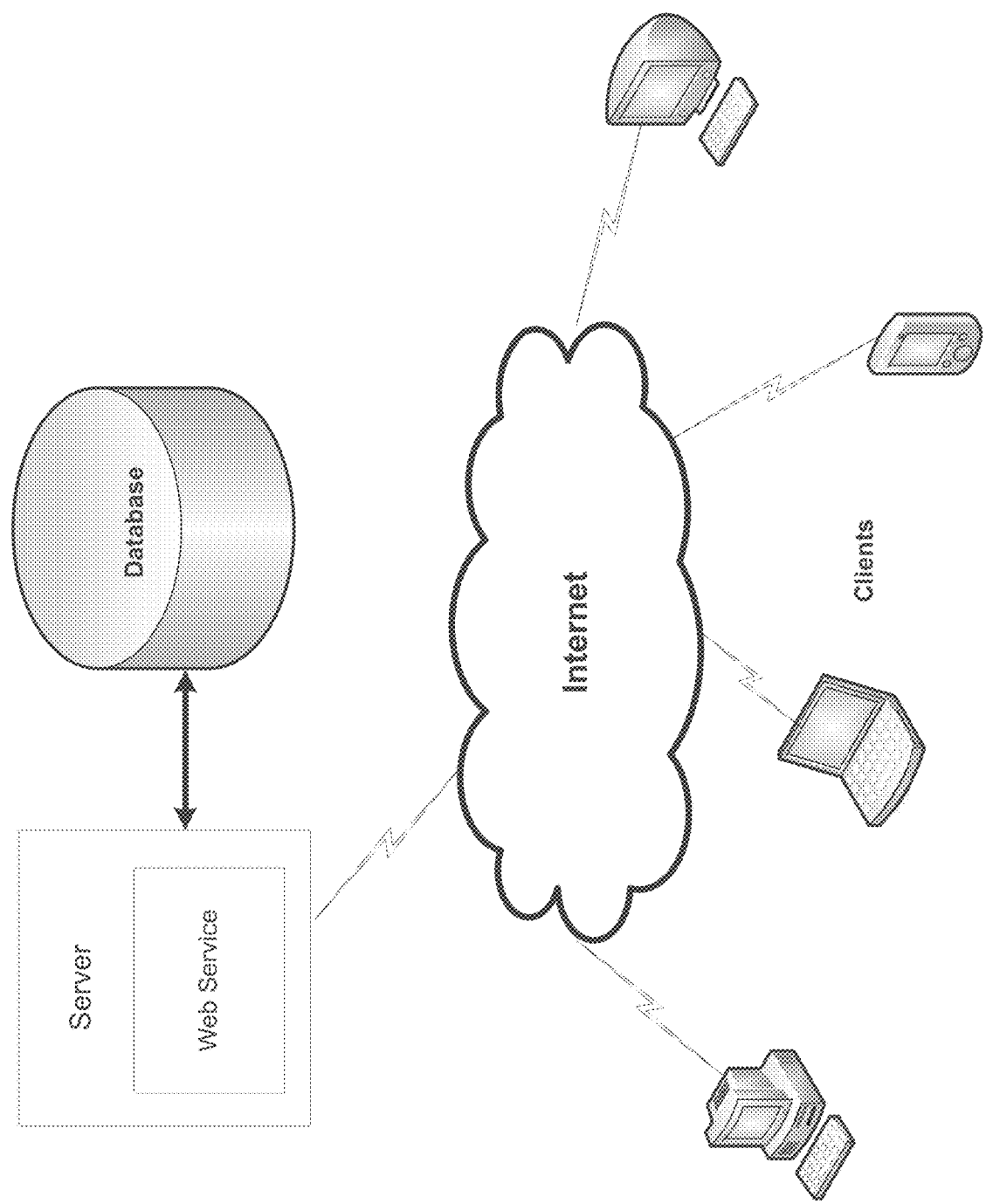
FIG. 2 is a block diagram that illustrates a plurality of clients that access a web service that is implemented on a server, such as a WebLogic Server from Oracle Corp. in an embodiment.

FIG. 2 is a block diagram that illustrates a plurality of clients that access a web service that is implemented on a server, such as a WebLogic Server from Oracle Corp. in an embodiment. In other embodiments, other implementations of a web service can be used. The server can be in communication with a database in order to perform web services for the illustrated clients. In an embodiment, the web service can be part of a system, such as a CRM system, disclosed herein.

CRM systems are commonly used to assist a business entity by providing various functionality, such as service request lifecycle management, marketing campaign generation or management, sales support, technical support, complaints management, billing, call center, support, and the like. For example, "Siebel" CRM, from Oracle Corp., can be leveraged by an organization for one or more of these functions.

Figure 3:
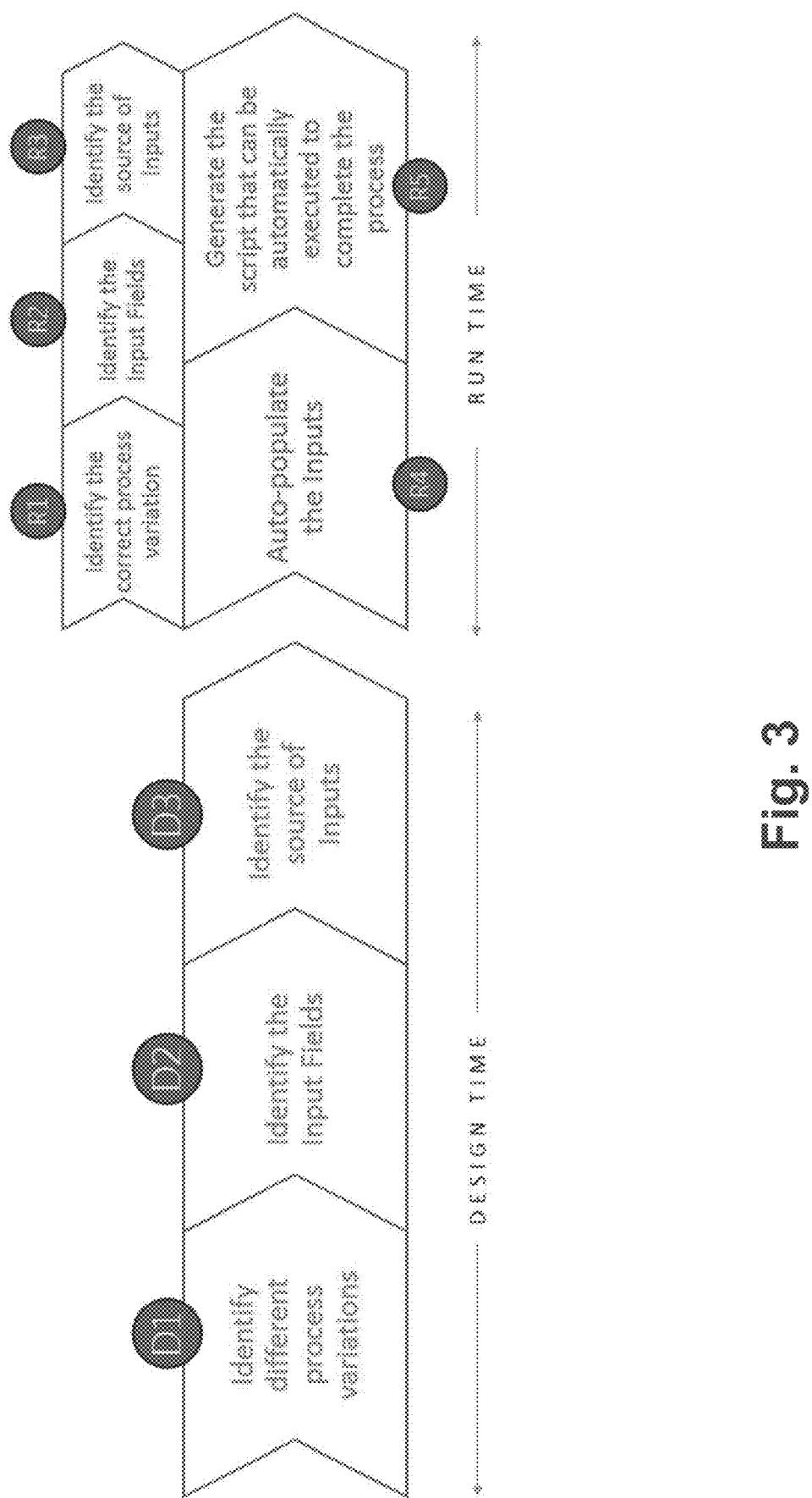
FIG. 3 illustrates a functional diagram for achieving process flow generation/learning according to an embodiment.

FIG. 3 illustrates a functional diagram for achieving process flow generation/learning according to an embodiment. For example, FIG. 3 separates the functionality of various embodiments into design time and run time. The design time functionality can include: D1—the identification of different process variations; D2—the identification of input fields; and D3—and the identification of sources of input.

In some embodiments, D1 can include training a machine learning component (e.g., a bot for achieving automated functionality) to classify a process flow from among a variety of potential process flows. D2 can include training a machine learning component to identify input fields. D3 can include training a machine learning component to identify sources of the inputs. As further disclosed, the training data for the machine learning components can include CRM data and log data that tracks a user's interactions within a CRM system (i.e., a user's clickstream).

In some embodiments, the run time functionality can include: R1—the identification of process variations; R2—the identification of input fields; R3—the identification of sources of input; R4—the auto-population of inputs; and R5—the generation of code that can automatically execute the generated processes. In some example implementations, D1, D2, and D3 can include training machine learning components and R1, R2, and R3 include performing predictions based on the machine learning components that were previously trained. As further disclosed, embodiments include determining correlations between actions, objects, and inputs that indicate rules, and these correlations and rules can be used to perform the run time portion of FIG. 3 (e.g., R1, R2, R3, R4, and/or R5).

In some embodiments, a CRM system can include the generation and management of tickets or service requests, which represent issues to be addressed or handled within the system. For example, a CRM system can manage a generated ticket throughout various stages of a life-cycle. A ticket can be generated under certain conditions, such as predetermined conditions. For example, a ticket can be generated when data that relates to a complaint (with necessary validation) is populated and saved in the CRM system.

In some embodiments, the resolution of the ticket includes a series of actions or tasks, many of which are commonly performed by a human agent. A process flow can refer to the combination of sub-steps or actions taken. A process flow can be specific to a generated ticket. In other words, a process flow can depend on the data that is populated when the ticket is generated. A different ticket generated based on different data may result in a different process flow.

A process flow for a generated ticket is an example for illustration purposes. The set of actions in a CRM system based on any business logic can be termed as different process flows. While embodiments leverage process flows for generated tickets, the disclosed techniques can be applied to any set of actions that can be considered a process flow for other uses cases, such as different CRM systems.

In various implementations, a process flow can be a series of click streams (e.g., mouse click streams, tap streams from a mobile device, and the like) with data being injected at various points. For example, click stream along with their related data can be captured based on usage pattern tracking ("UPT"). For example, usage pattern tracking can include capturing the navigation of a user or agent within a CRM system. This navigation can include the manner in which the user interfaces with the system (e.g., cursor clicks, text input, and the like). The captured UPT data can dumped into logs, which can be saved in local file system or in databases in some implementations.

Embodiments generate meaningful patterns from the captured logs that can mimic business logic and execute an auto-generated process flow without human supervision or inputs. In some embodiments, the stored UPT logs are accessible via a file system (which is typically the case in Siebel CRM).

In some embodiments, a user or agent can resolve a generated ticket by interfacing with the CRM system. A captured UPT log that stores interactions used to resolve this generated ticket represents the process flow executed by such a user. Embodiments include several of such process flows that can be saved in the form of UPT logs. These process flows saved as UPT logs can serve as training data for a learning system from which patterns can be generated.

Embodiments include leveraging the UPT process flow data in combination with CRM data. For example, CRM data can be data retrieved from a CRM database. In various embodiments, the CRM data can serve a variety of purposes. For example, the CRM data can serve as the source of truth to classify processes into different buckets. As disclosed, UPT logs can be used to capture different processes and sub-process flows. However, CRM data is used to achieve process classification into a particular category.

For example, consider a ticket generated to "change the address" of a customer/client/user. A process flow for this example may broadly encompass two categories, namely the process flow for changing the address and the process flow for denying the request. In this example, the classification of flows can depend on a multitude of parameters within the CRM data for the generated ticket. This classification ultimately allows the learned processes to be performed in an automated manner. For example, a bot (e.g., a machine learning bot that can mimic the behavior of a human agent) can automate process flows when new data is available based on the classification of the process flows into one or more categories.

In some embodiments, the decision making ability of the bot does not end in just categorizing the process flows. Classification of sub-process flows or, at times, at any point where a decision needs to be taken for a possible classification of the flows can be included in the bot's machine learning functionality.

In some embodiments, the CRM data can be correlated with the UPT process flow data. For example, various sub-steps in a particular process flow will depend and various data elements. The machine learning bot is configured to understand what CRM data fits into those sub-steps in a process flow.

Embodiments of the disclosure relate to techniques used to generate and/or recognize patterns, determine how these patterns mimic actual examples of business logic, determine how relevant data is inserted or used at different points, and formulate a comprehensive process flow and the execution of this process flow in an automated manner without a human agent. Embodiments depend on detailed data in order to perform the disclosed machine learning and automated process flows. In some implementations, two sets of data are fed to a machine learning entity (e.g., bot)—the UPT logs and the CRM data.

In some embodiments, the UPT logs capture user interactions for numerous process flows, and this captured data can be stored for use to train one or more of the machine learning components. For example, the logs can be generated as a user or agent navigates the CRM system (e.g., to perform a process flow). The logs can include numerous user navigation details, such as an applet, control name, action performed, and data exchanged. These detailed logs can then be fed to a model generating the CRM framework (e.g., a CRM bot).

In some embodiments, the UPT logs include at least these three relevant pieces of information: 'Action', 'Target Object', and 'Inputs'. For example, the 'Action' can specify a user interaction ("UI") event, such as clicking on a combo-box, inserting some data in a text field, and the like. The 'Target Object' and 'Inputs' are relative to the 'Action' that is being taken by the user.

For example, a typical 'Action' for Siebel CRM system might be 'GoToView' or 'SelectRecordinPickApplet'. The TargetObject specifies where or on which UI context/object the Action has been performed. In some embodiments, not only is the final object captured, but also the context. An example in Siebel CRM system can be and 'Account Contact List Applet|SSA Primary Field|1'. This example specifies that the 'Action' was performed on 'SSA Primary Field' which is part of the 'Account Contact List Applet' and is on position '1'. Given this data, the applet is the context here and the position specifies that the user performed the 'Action' on the 1st record of the applet. In this example, the different information is also concatenated together in the 'Target Object' with the help of a standard delimiter (e.g., '|'). This is an example representation of data, and other suitable representations can be implemented. For example, different data elements can be grouped with any suitable delimiter or stopword, or other forms of context representation can be implemented.

In some embodiments, the 'Inputs' can represent actual data that is communicate or exchanged. For example, the 'Inputs' data can be data that is input into any field (e.g., user input form) or any data that is being fetched from an object (e.g., a ComboBox user interface object). A typical example in Siebel CRM might be '1-ASAP' or 'Declined'. Recall that both the 'Inputs' and 'Target Object' are considered with respect to the 'Action' performed.

In some embodiments, UPT logs can include a number of other data elements/columns of data. For example, a 'Case-ID' can be the row index of the data. Both the number of test-cases and the sub-steps in an individual test-case can be included. For example—if the data set contains 1500 iterations of a process with 20 sub-steps in each process—then the typical cases will be "Case1-1, Case1-2, Case1-3, . . . , Case1-19, Case1-20, Case2-1, Case2-2, Case2-3, . . . , Case2-20, Case3-1, Case3-2, . . . , Case3-20, Case4-1, . . . , Case1000-1, Case1000-2, . . . , Case1000-20, Case1001-1, Case1001-2, Case1001-3, . . . , Case1001-20, Case1002-1, . . . , Case1002-20, . . . , Case1499-1, Case1499-2, . . . Case1499-20, Case1500-1, Case1500-2, . . . , Case1500-20".

Figure 4:
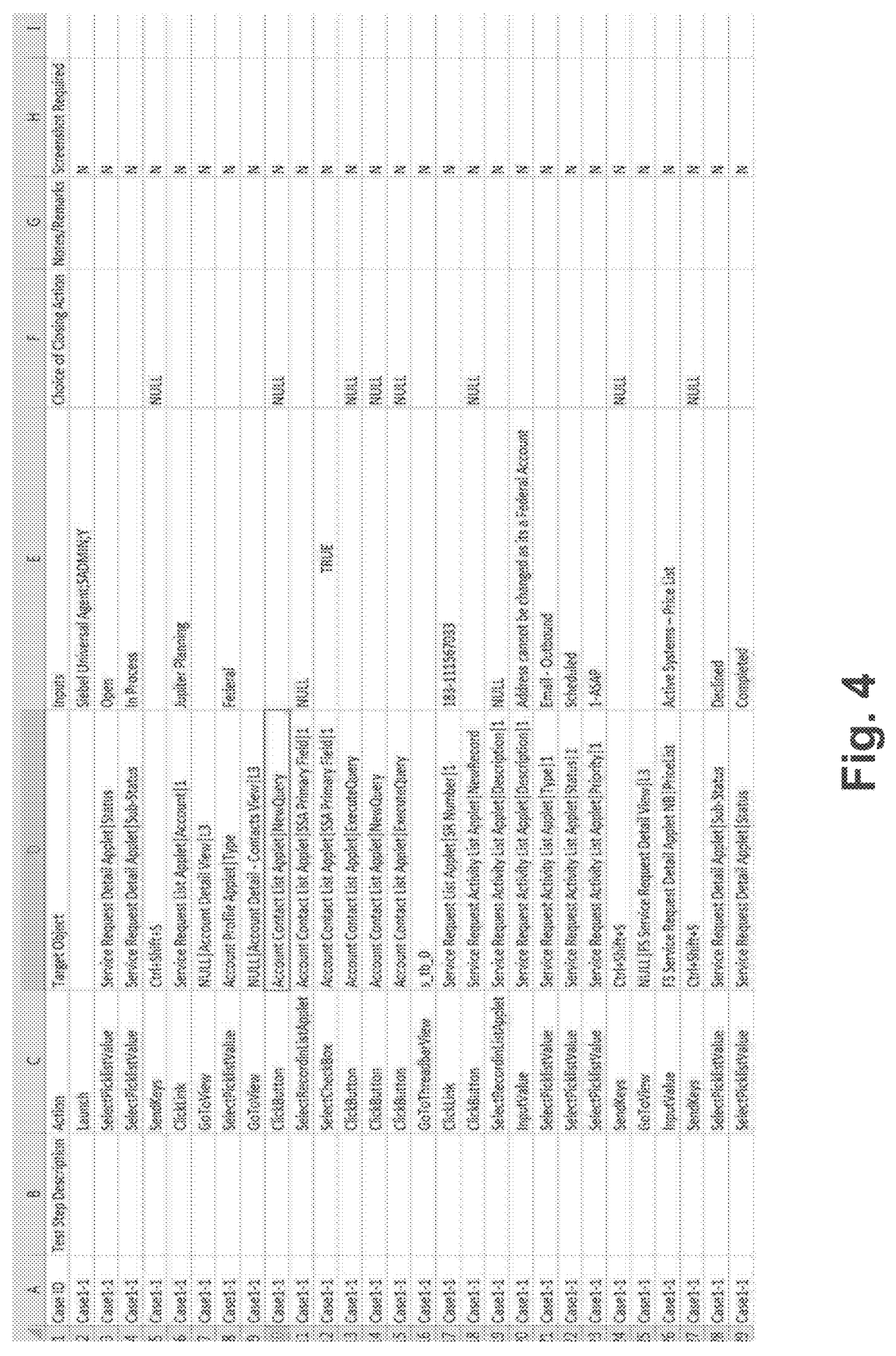

Other columns, such as 'Screenshot Required' or 'Notes/Remarks', can be used sporadically during user navigation. In some embodiments, these columns can be ignored and discarded while preparing the data for further analysis. The data captured in the UPT logs as described above can also be referred to as process data and can be exported as a .csv file. FIG. 4 illustrates example columns of UPT data according to an example embodiment.

In some embodiments, the CRM data is not structured into specific columns like the UPT data. Instead, CRM data can represent the data stored in the CRM database. In one implementation, the CRM data can be in the form of tables with the number, type, and name of the columns being different from table to table. For example, a ticket (e.g., service request) based table might have 9 columns with ticket specific data, while an account or an employee table will have different numbers of columns with the name and type of the columns being different too. In other words, the CRM data can be a structured database store that implements a data schema.

Figure 5:
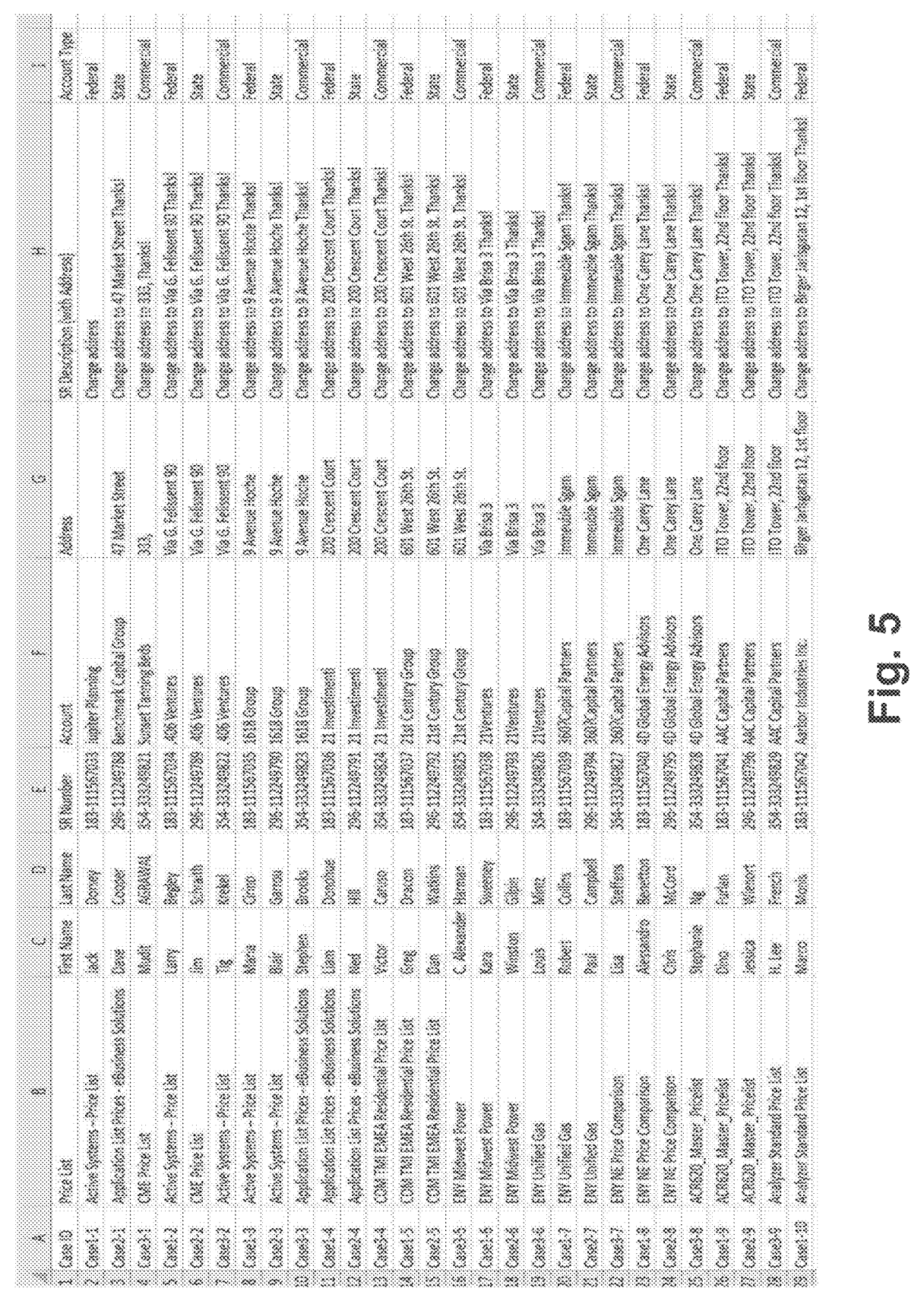

In some embodiments, UPT log data is different from CRM data due to a variability of the number, type, and name of columns. For example, some implementations of UPT data have a consistent and specific set of columns, such as 'Action', 'Target Object', and 'Inputs'. In various embodiments, CRM data is a dynamic database that stores complex data sets and that can be queried to achieve a large number of end functions. Thus, CRM data can have variability to its structure. In these implementations, one advantage for CRM data over UPT data is that CRM data can be cleaner with fewer missing values and can have preexisting validations policies that are enforced. FIG. 5 illustrates example retrieved CRM data according to an example embodiment. In some embodiments, the CRM data and the UPT data are used to train machine learning functionality. For example, the CRM data and the UPT data can be pre-processed to provide training to the machine learning component (e.g., bot).

Embodiments include machine learning functionality that learns to identify a process flow based on the CRM data. For example, a human agent may similarly identify a process flow based on CRM data when the automated system disclosed herein is not available. In some embodiments, based on data entered for a generated ticket, the sub-steps for completing the ticket and the sequence that these sub-steps need to be executed (e.g., a process flow) can be identified.

Embodiments implement a supervised learning approach. For example, the supervised learning can be performed to classify a task. In a sample implementation, the output of such trained machine learning functionality can be a 'Case ID'—that needs to be predicted. In this instance of learning, subcase Ids (e.g., whether it is Case 2-1 or Case 2-2 or Case-3) are not considered. In some embodiments, the flow begins by Pre-processing the data where the subcase to remove subcases from each case (e.g., from every row of the CRM data). At the end of this pre-processing, the data has a simplified Case ID (e.g., 'Case 1', 'Case 2', or 'Case 3'). The data can also be cleaned where any possible null values or duplicates are removed.

After pre-processing, the data can be used to train the machine learning functionality. For example, a first model can be a decision tree, which works on the basis of entropy or information gain. The data can be broken into training data and validation data, for example by random sampling. K-fold cross validation can also be implemented (e.g., at a value of k=10, or other suitable values).

Figure 6:
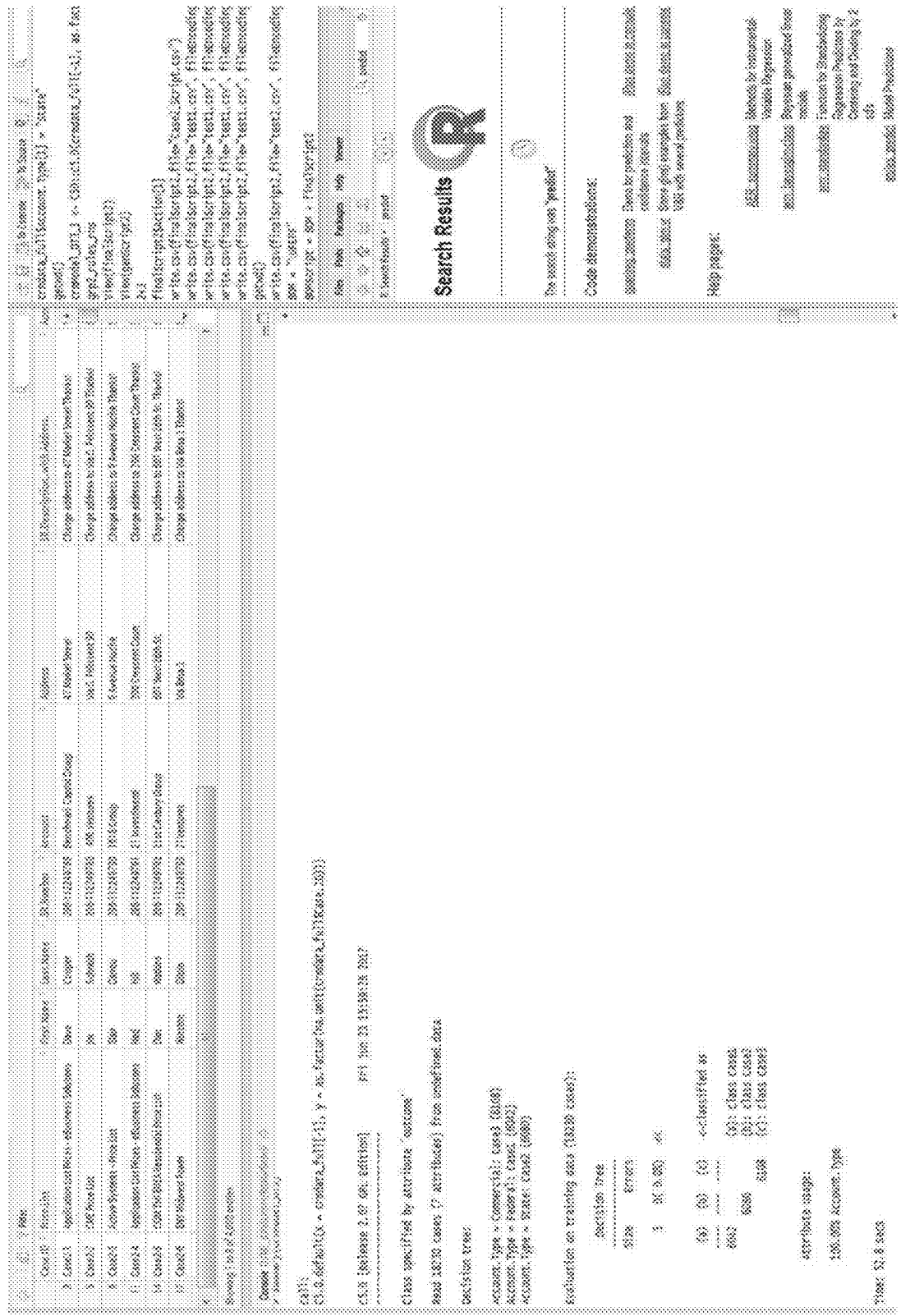
FIG. 6 illustrates an example of a confusion matrix where 100% accuracy has been observed on a particular CRM data dump according to an example embodiment.

In some embodiments, a C5.0 algorithm from the package 'C50' of the Iterative Dichotomizer family can be leveraged to build the decision tree logic. The accuracy can be further increased by performing bootstrap sampling. In some implementations with non-linear data, the accuracy can be high (>98%). An example of a confusion matrix where 100% accuracy has been observed on a particular CRM data dump is shown in FIG. 6.

Some embodiments include more complex, non-linear data, in which case a neural network can be used to learn patterns and classify the data into correct cases. For example, in order for the disclosed algorithms to identify Case IDs, the data has been pre-processed to remove any NULLs and Duplicates. The values can also be normalized before training using the standard formula: $X-\min(x)/(\max(x)-\min(x))$.

Figure 7:
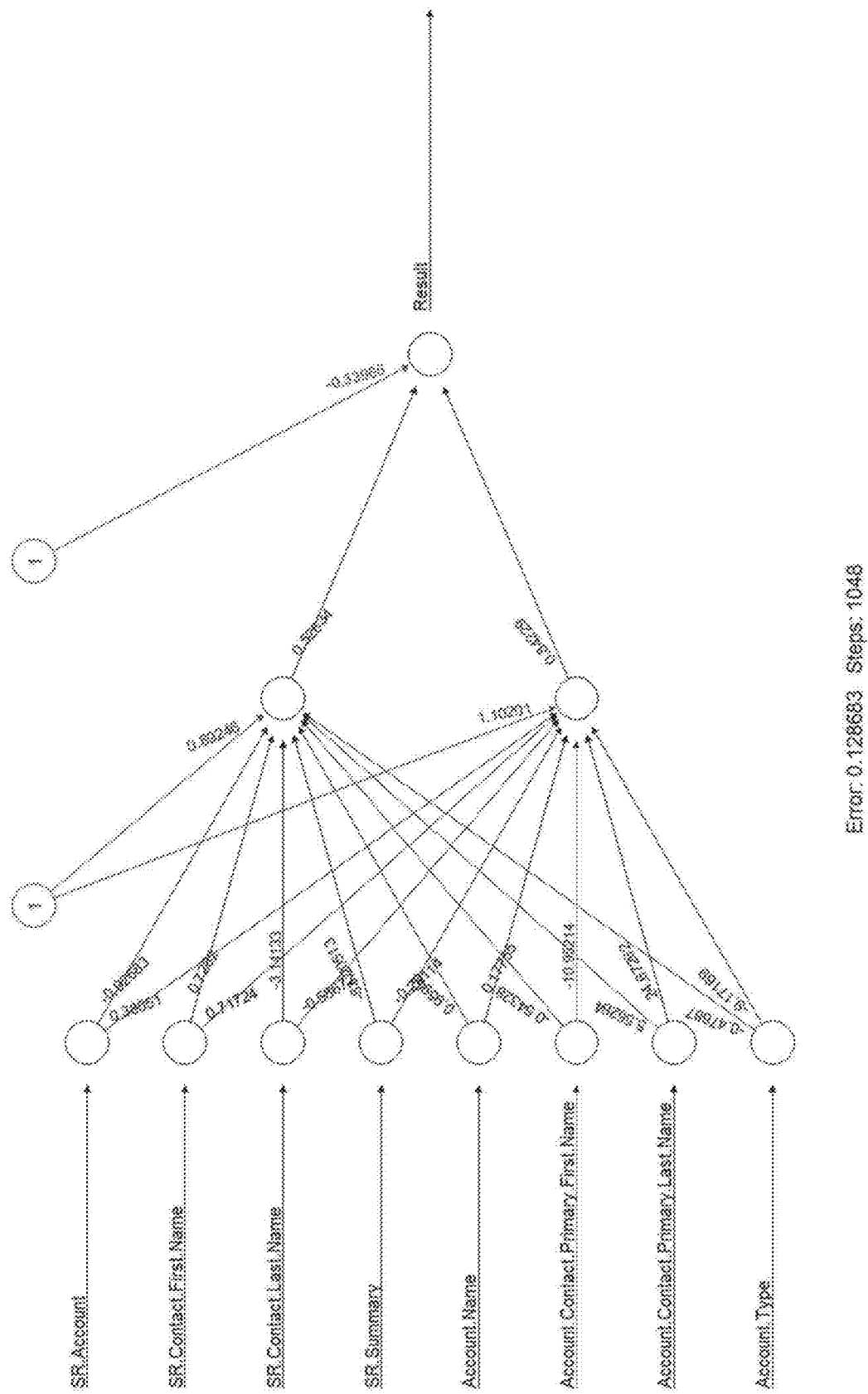
FIG. 7 illustrates an example of a model with 2 hidden neurons in the $1^{st}$ hidden layer according to an embodiment.

In some embodiments, sampling can be used to divide the data into training data and validation data. When a neural network is leveraged, a 'neuralnet' package in R can be used to train the model on the complex data. FIG. 7 illustrates an example of a model with 2 hidden neurons in the 1st hidden layer according to an embodiment. When a generic model of neural network is implemented, the classification task can reach very high success rates. For example, based on sample executions, different dumps of data were taken and validated to achieve a generic model that could identify various process flow case ID's.

Once the process flow is identified, the next logical task is to identify sub-steps within the process flow. In some implementations, this task is complicated because data is to be identified and populated at these various sub-steps. For example, consider that Case 1 includes 20 sub-steps for a human agent to complete a process flow. A trained machine learning solution (e.g., an autonomous bot) may also execute these 20 sub-steps, and many of these sub-steps can include data population. Thus, embodiments of an end to end solution includes identifying data at or all or some of these 20 sub-steps. Embodiments of a logical flow of the machine learning task at hand is given below:

Identify the sub-steps of a previously identified Case ID
Identify a set of these sub-steps that includes the population of data
Identify the data to be populated for each of the set of sub-steps Embodiments that identify sub-steps of a process flow and the sub-steps that include data population can be accomplished by the following functionality. In some embodiments, UPT data logs show that the 'Action' column governs process flow data. Identification of relevant actions (e.g., an 'Action" with data input) can be performed. In an example, this identification is performed with a generic algorithm because apriori knowledge about the different sub-steps for any particular process flow may not be available.

In some embodiments, rules can be discovered between actions and target objects. These discovered rules can be sorted, for example based on a confidence for the rule prediction, or based on support. Rules can provide associations between target objects and each action. Support can refer to a ratio of the number of instances a specified columns' values are consistent to the total number of rows (e.g., in a logfile). For example, specified column values can be action and input, action and target object, target object and inputs or any combination. An example combination might be: action, target object, and input.

For each of the target objects that includes a rule with an associated action, rules can be discovered between target objects and inputs. In some implementations, the input that has the highest degree of variance (e.g., have low support) correspond to the input data which is being input by the user in the training data.

Figure 8:
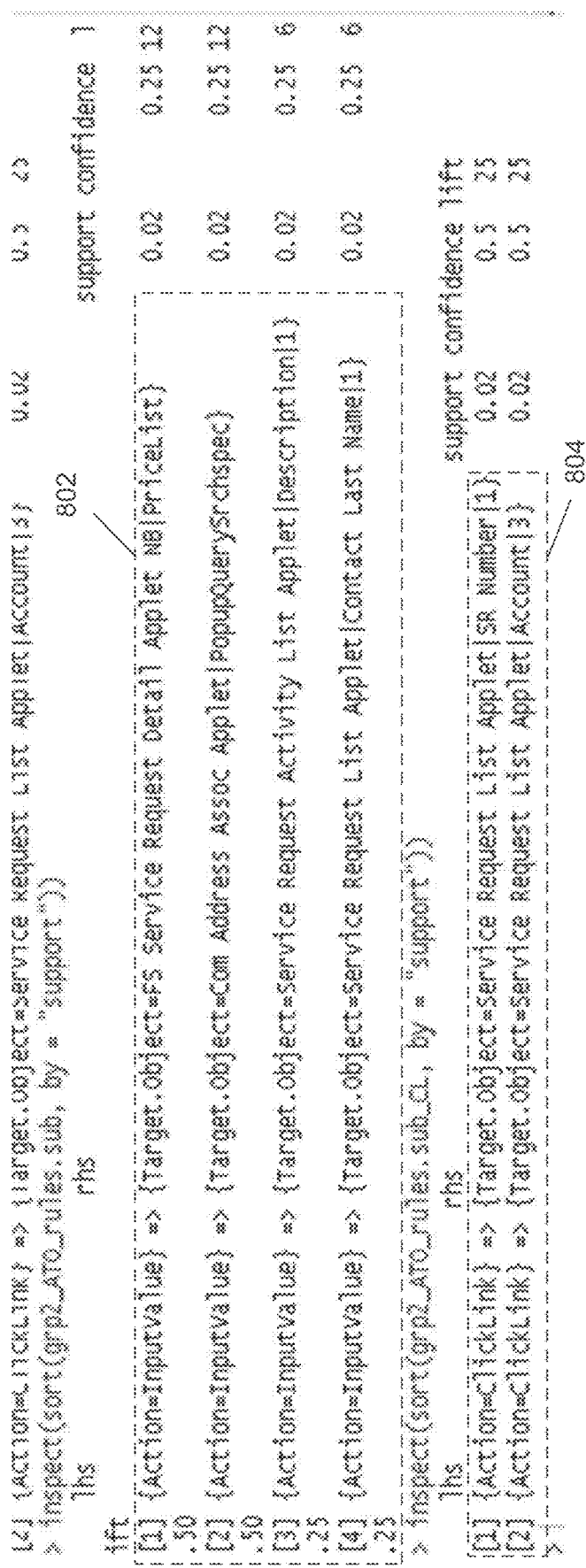
FIG. 8 illustrates various rules between different 'Actions' and the corresponding 'Target Objects' according to an example embodiment.

With reference to FIG. 8, consider a use case including the "Actions" column and a 'Target Objects' column. FIG. 8 illustrates various rules between different 'Actions' and the corresponding 'Target Objects' according to an example embodiment. In an example, InputValue can be a value for the 'Actions' column and 'FS Service Request Detail Applet NB|PriceList' can be a value for the target.object column. FIG. 8 shows that the support for this example is 0.02. In other words, the ratio of the numerator ('InputValue' and 'FS Service Request Detail Applet NB|PriceList' appearing together) to the denominator (total number of rows) is 0.02. This low support indicates that this input data is being input/selected by a user.

For example, consider that a particular process flow includes 20 sub-steps. At this stage, the 20 sub-steps have been identified. Out of these 20 sub-steps, consider that 3 sub-steps (i.e., sub-step 5, sub-step 7, and sub-step 15) include dynamic input data from the user agent. In some examples, other sub-steps may include data that is static. Example of a dynamic input data include an address, contact person name, or other input data that varies for different iterations of the identified process flow. For example, sub-step 3 may include the input of the contact name for every iteration of the process flow.

In some embodiments, to identify this dynamic input data, rules between target objects and inputs are sorted with increasing order of support. For example, the rules with the lowest support can represent inputs that change for different iterations of the same process flow. In this example, consider 1000 training iterations of an identified process flow, where sub-step 3 has different inputs for these 1000 iterations. On the other hand, if a particular sub-step like sub-step 10 requires static data, then the support of that rule will be high.

In some embodiments, sub-steps that do not include any inputs will not be listed under the rules between target objects and inputs. In view of the above identifications, the sub-steps that include dynamic input data, static input data, and no input data have been identified at this stage. FIG. 8 illustrates various rules between different 'Actions' and the corresponding 'Target Objects' according to an example embodiment.

In some embodiments, a next logical task is to fetch the dynamic data (e.g., identified for some sub-steps) from the CRM data. For example, consider that a human agent knows that the contact person name is populated in sub-step 3 of the identified process flow. In some instances, this contact person name may be picked from the database column name 'Person' of the CRM data (or a 'Business Component Field' name in case of the Enterprise Application Siebel CRM). In some embodiments, a machine learning solution or bot is tasked with learning this logic, i.e., from where to fetch the Contact Person Name?

In some embodiments, the value of the dynamic input data can be based on the rule matching previously performed. For an analogy with a previous example, consider that out of 1000 iteration of the identified process flow, the contact person name is taken from the input column of a sub-step 3. This could potentially result in close to 1000 different contact person names in a vector. This can present unique challenges for a machine learning solution.

Figure 9:
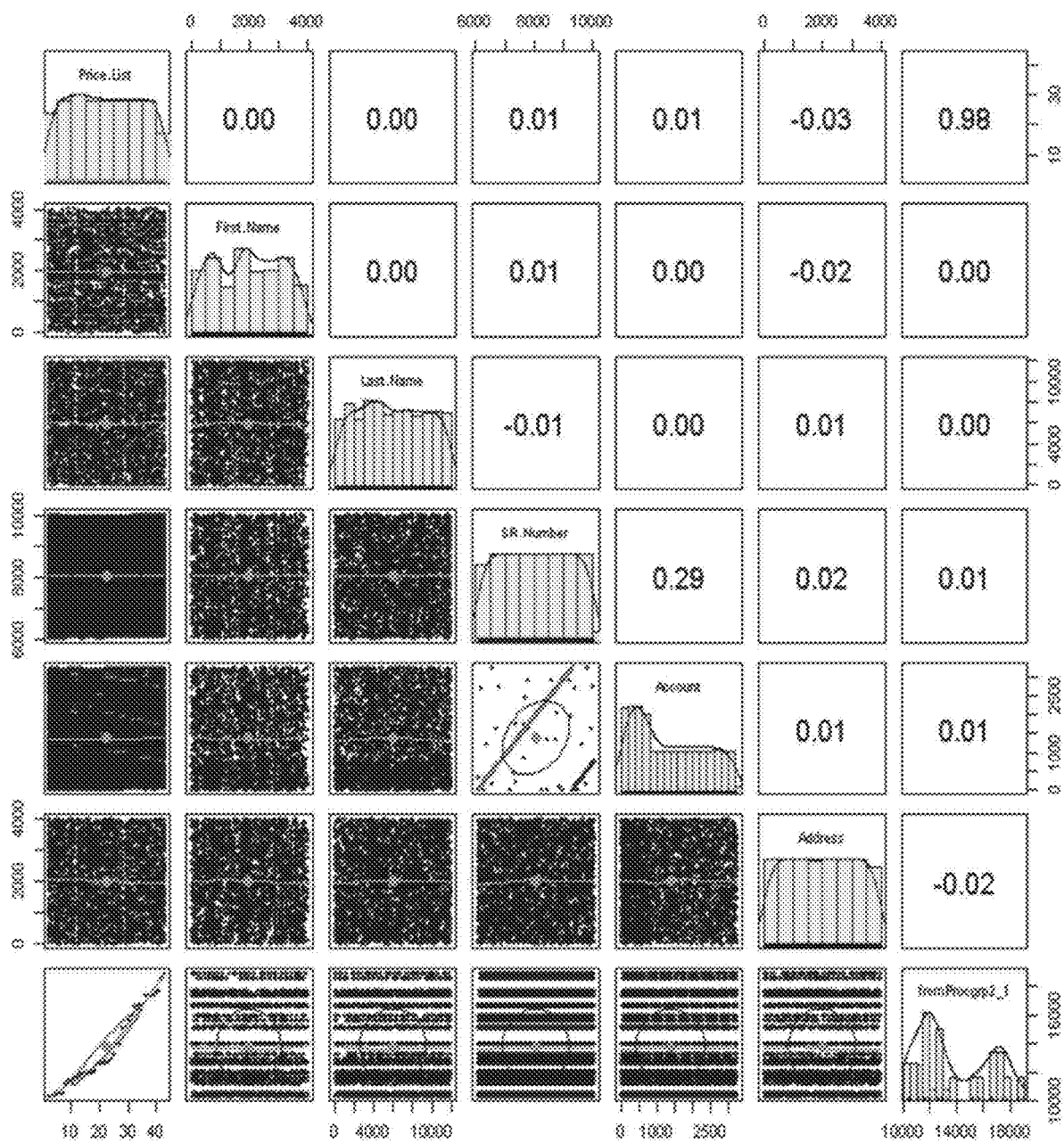
FIG. 9 illustrates an example of the plot of different correlation values for such a comparison according to an embodiment.

However, the CRM data can also be analyzed, which can show that a particular column (e.g., Person) is the target column from which the human agent has actually picked the contact person data. In this example, to facilitate the learning, a correlation can be performed with a Pearson Correlation Coefficient value between the generated vector (of close to 1000 different contact person names) and the columns of the CRM data. In the above example, the highest correlation value will be between the vector and the 'Person' column from which the human agent had actually picked the contact person name. Similar techniques can be used for other dynamic input values that were picked and stored (e.g., in different vectors). FIG. 9 illustrates an example of the plot of different correlation values for such a comparison according to an embodiment.

For example, in FIG. 9, the machine learning functionality or bot learns that 'Price List' is the CRM column from which the input data at a particular sub-step is being populated. This is at least because the correlation between the PriceList column and the target column (from ProcGrp2_1) is higher (=0.98) than the other coefficients calculated. This column identification for dynamic input data can be used to accomplish the end-to-end solution. For example, the data from the identified columns of the CRM data can be retrieved and inserted at the particular sub-step (in our example—sub-step 3) programmatically. In some embodiments, the above process can be repeated for sub-step input data associations to complete execution of the process flow.

In some embodiments, for new incoming data (e.g., used to generate a ticket), the trained model can predict the Case ID of a process flow to be performed. The identified process flow can have multiple sub-steps, which can be predicted from the rules matching techniques. The sub-steps that require dynamic data can also be identified from the rules given the comparison techniques disclosed. For example, a performed correlation can provide the CRM data location (e.g., table and/or column) from which the identified dynamic data is to be retrieved.

In an example use case, consider a call center agent that handles various customer queries. While working on different requests, the user navigates the CRM software, and the user's interactions with the system are logged. This process data, captured over a sufficient duration, along with the CRM data, can be used to train the machine learning components for autonomous execution of service request processing. Consider a scenario where a 'Change of Communication Address' request arrives and how the new autonomous engine processes the request.

In an embodiment, the system can first identify the process flow for the request. Leveraging data that represents how agents have identified and followed process variations to complete the tasks for the request (e.g., UPT and CRM data), the machine learning algorithm can learn from the processes and corresponding transaction data. As disclosed, other decision making steps can also be learned, such as sub-steps of the process flow. For example, decision tree supervised learning can be used to classify process flows.

In an example of FIG. 6, R code can read training data with 7 attributes and build the decision tree model. The model can quickly learn to predict the process flows accurately (e.g., in minutes or less than a minute). For example, the algorithm can identify broad steps, and at each decision step, can identify which route to select within the decision tree.

In some embodiments, the attributes (e.g., 7 attributes in the example as illustrated in FIG. 6) can be independent variables or features of a classification based supervised machine learning model. For example, the attributes can be selected from the CRM data shown in FIG. 5. In this example, some columns/values, such as 'SR Number', can be removed to arrive at a learning model.

In an example, a predicted variable for the learning model, or the dependent feature, can be 'Case ID'. The learning can be aimed to predict the correct Case ID (e.g., Case 1, Case 2 or Case 3) using 7 independent attributes or features. In this example the attributes can be 'Price List', 'First Name', 'Last Name', 'Account', 'Address', 'SR Description', and 'Account Type'.

For some implementations, to prevent overfitting, the number of attributes or independent features can be reduced. For a base model of a decision tree, bagging (i.e., sampling with replacement) was applied to get generate generic regularized results. The validation ratio was kept at 0.20. In other words, 20% of the data was used for testing/validation and 80% of the data was used for training. K-fold Cross validation with K as 10 was used to help the learning model prevent from overfitting.

In another example implementation, these seven attributes or features were leveraged to build an approach with neural networks to predict the Case ID. Considering a human agent, the agent would be tasked with selecting one of 3 Case ID's (e.g., Case 1, Case 2 or Case 3) from the example data of FIG. 5 when an 'Address Change Request' ticket (or Service Request) was raised. The machine learning model, as described in this embodiment, mimics the human intelligence by performing this classification task by learning patterns using a decision tree or neural network.

Once the relevant process and sub-steps are identified, embodiments include predicting sub-steps with data input. For example, using the CRM data and UPT logs, a machine learning component can be trained to identify sub-steps with data input. Embodiments include an apriori algorithm for learning association rules. For example, given a set of item sets, the algorithm can determine subsets which are common to at least a minimum number of the item sets (e.g. Retail Basket Analysis).

As disclosed, in some embodiments the rules can identify associations between 'Action', 'Target Object' and 'Inputs' columns. The domain knowledge of embodiments of the UPT framework can narrow the logic and create rules for every process flow. In other words, for a particular process flow where an address is changed, 4 rules can be generated between "Action=InputValue" and 'Target.Object' as an example. These 4 rules are illustrated in FIG. 8 as rules 802. For example, when the Action is 'InputValue', these rules indicate 4 frequent 'Target Objects'.

Embodiments include using the corresponding 'Target.Object' values as inputs to generate a second set of rules between 'Target.Object' and 'Inputs' columns. In this example, 2 rules can be generated when 'Action'='ClickLink'. These 2 rules are illustrated in FIG. 8 as rules 804. For example, when the Action is 'ClickLink', these rules indicate 2 frequent 'Target Objects'.

Once the input fields in the process are identified, embodiments can capture the information about the source from where data is to be retrieved. The source can be internal to the CRM or external, from other applications. As disclosed, source identification can be achieved by calculating correlation coefficients of a target value with all the columns of the corresponding CRM training data.

At run time, embodiments identify the process flow to be executed and further identify the sub-steps of the process flow and the relevant data to generate the complete process flow that can be executed. Embodiments can process an incoming signal from a variety of Internet of Things ("IoT") devices. Based on how human agents have addressed similar situations in the past, the system can identify the process steps and automate the data input sub-steps to complete the flow without human involvement. Embodiments of the system can be self-adapting to different combinations of process variables.

Embodiments include techniques that can be used to mimic process flows for generic processes, for example in a Siebel CRM system. For example, a complete process flow can be generated based on the disclosed machine learning techniques and/or by a trained bot. The generated process flow can send a trigger to the Siebel CRM system that instructs a business service to run through the sub-steps disclosed in the process flow as identified by the bot. Alternatively, the CRM system can continually poll to understand when a complete process flow has been generated (e.g., based on data associated with a generated ticket). The same business service can then be executed to run through the sub-steps of the process flow identified based on the polling.

Embodiments include systems and methods to learn or predict potential classifications of process flows for a certain action (e.g., sub-steps in the process flow). The number of classifications is not bound to a predefined threshold. In some embodiments, the learning includes learning sub-process flows under the process flow based on variations in data and/or business logic. In some implementations, the sub-process flows are also not bound to any constraint and can be deemed to be separate process flows.

In some embodiments, the learning can include categorizing new incoming data into possible classifications based on a model (e.g., learned using existing process flow training data). The technique can further categorize the new incoming data into possible sub-classifications based on the model. In some embodiments, the learning can include automatically generating the sub-steps of a process flow or sub-process flow based on the classifications. Techniques can also coalesce or sequence the sub-steps of a particular classification to form a process flow.

In some embodiments, identifying or recognizing sub-steps in a process flow is based on an influx of relevant data. For example, data relevant to a particular process flow or sub-steps of a process flow can be learned. This learned data can then be retrieved, generated, or otherwise obtained in order to perform the identification. In some embodiments, embellishments associated with the generated process flow to enable programmatic execution of the process flow in a CRM environment can be performed. Embodiments include execution of these techniques synthetically with a controlled program (e.g., that includes a trained machine learning component) and without the supervision of an agent.

Figure 10:
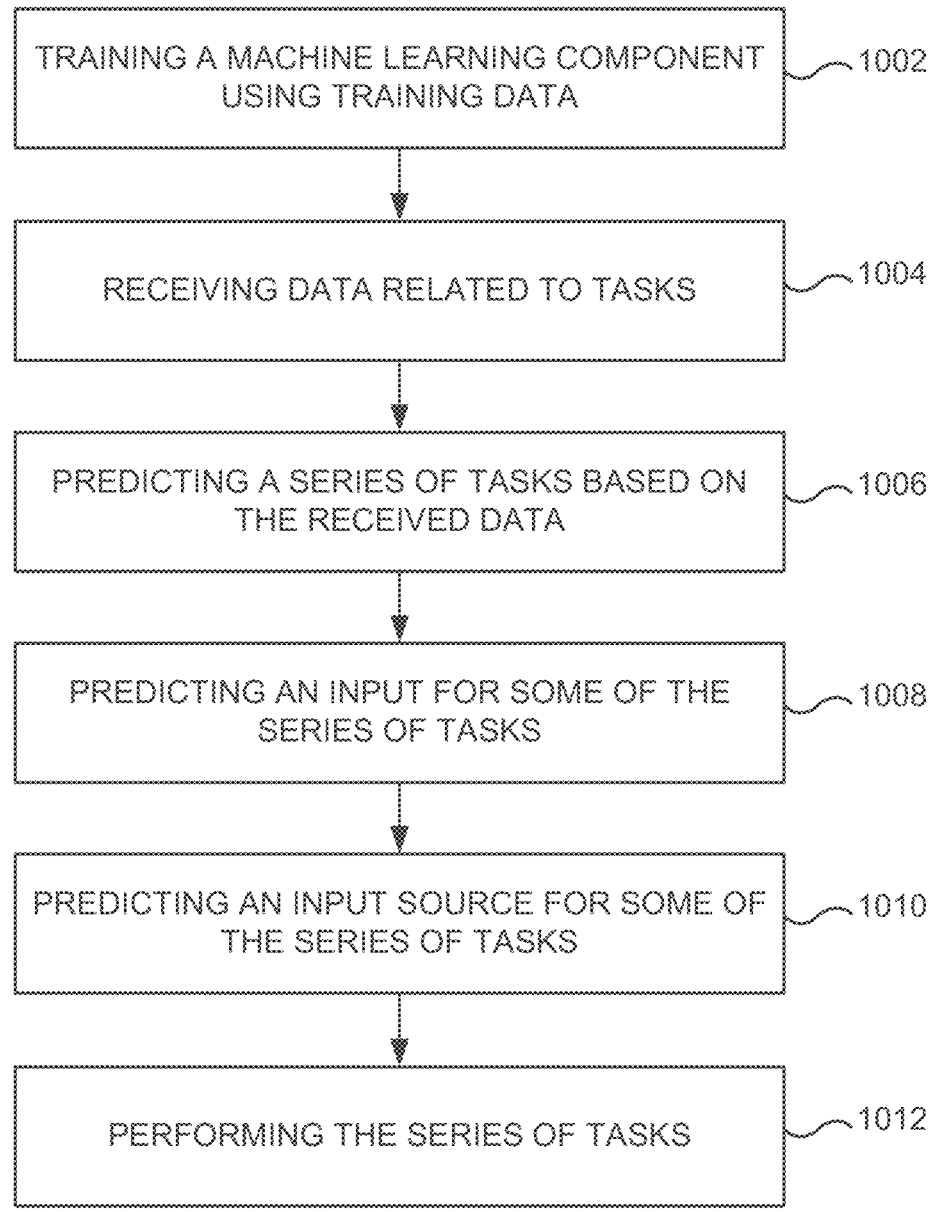
FIG. 10 illustrates an example functionality for performing an automated process flow using machine learning according to an example embodiment.

FIG. 10 illustrates an example functionality for performing an automated process flow using machine learning according to an example embodiment. In one embodiment, the functionality of FIG. 10 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1002, training a machine learning component using training data that represents a user's past interactions with a software application when performing a plurality of process flows, wherein each process flow includes a series of tasks in a sequence. For example, training data can include CRM data and UPT data for a CRM application. The training data can be pre-processed such that the machine learning component can identify trends in the data.

At 1004, data related to tasks within the software application is received. For example, a ticket can be generated that can be resolved by performing a series of tasks in the CRM application.

At 1006, a series of tasks and a sequence for the predicted series of tasks based on the received data is predicted using the trained machine learning component. For example, an identification of a classified process flow can be predicted for the generated ticket, and specific sub-steps for the classified process flow can be predicted. The machine learning component can accomplish such a prediction based on the trends represented in the training data.

At 1008, an input for at least one of the predicted series of tasks is predicted using the machine learning component, wherein performing the one predicted task includes changing data in a database based on the input. For example, at least one of the predicted sub-steps can include data input into the CRM application. Such a prediction can be accomplished based on trends represented by the training data.

At 1010, a source for the input that is used to perform the database change is predicted using the machine learning component. For example, at least one of the predicted sub-steps can include data input into the CRM application, and correlations can be performed within the training data.

For example, correlations between the input in the training data and data stored in a database within the training data can be performed to identify a source in the database from which the input was taken.

In other words, the training data can represent multiple iterations of the classified process flow. The "input" from the multiple iterations can be aggregated to generate a vector. That generated vector can be compared to the CRM database to determine whether any columns of the database result in a high coefficient (e.g., high correlation). When the correlation meets a criteria (e.g., coefficient is greater than a threshold), it can be determined that the source of the input for this sub-step of the process flow is the column of the database with the high coefficient.

At 1012, the predicted series of tasks in the predicted sequence is performed. For example, a bot can be configured to perform the tasks in the CRM environment, some of which include changes (e.g., updates, deletions, or insertions) to a database.

As described above, user actions on a UI and the data inputs can be captured in the background and converted into readable process flows, using machine learning in some embodiments. These process flows can be the direct source for Process Mining and Process Automation. By capturing user actions as process flows, the assessment can be made on the process followed and the deviations from the process defined.

Usage Pattern Tracking in one embodiment can be used by administrators to: (1) Monitor how often users use a application, an applet, or a business component so that they have reliable information to change application configuration and features and to simplify the user interface; (2) Monitor how users use a feature in a application to facilitate user training and to gather details about the actions that lead to error conditions; (3) Monitor feature usage after application upgrades or during development cycles to evaluate the usefulness of upgrades or new development and to optimize test cycles.

Embodiments (referred to as a "Process Discoverer") translate the UPT data or any type of clickstream data into understandable process flows that can be analyzed by humans (for single process) or process mining tools (for bulk processes). Embodiments can further generate guided navigation flows.

Embodiments can be implemented within an Enterprise Application and can be enabled in the background as well (without any involvement or even knowledge of the user) in contrast to known systems that require an explicit manual decision to start monitoring. Further, some known systems only capture UI elements (e.g., clicks, fields) whereas embodiments, in addition to UI elements, also track the Business layer information required to re-execute processes in the application.

In some known systems, the output is just a UI process flow. In contrast, embodiments capture the process, executable actions and the input data for each step. Therefore, the output of embodiments is an ordered sequence of executable actions along with the input data that can be used to re-execute the process Embodiments store the process within an enterprise application in the database or as a .CSV file. It can also be stored in a Big Data storage such as Kafka.

Figure 11:
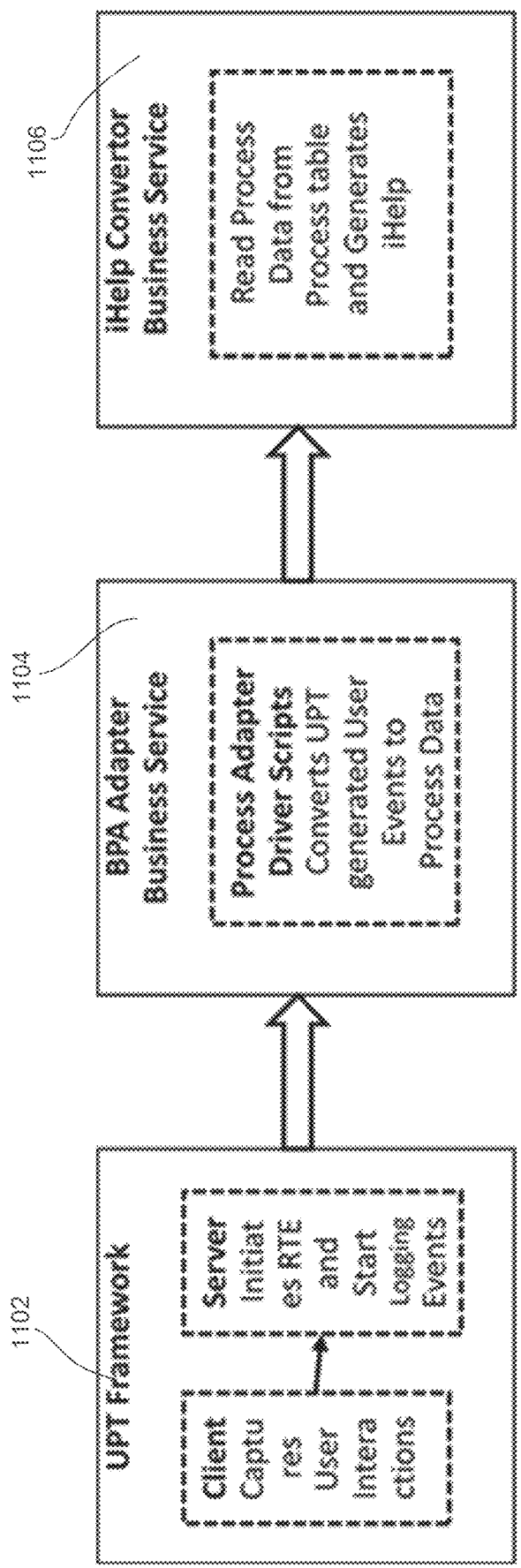
FIG. 11 is a block diagram of an example Process Discoverer for generating a process flow from a recorded sequence of steps in accordance to embodiments.

FIG. 11 is a block diagram of an example Process Discoverer for generating a process flow from a recorded sequence of steps in accordance to embodiments. The example of FIG. 11 is an embodiments that is used with Siebel CRM, but it can be applicable to any other similar system.

A UPT Framework 1102 records User Actions at the UI level as well as tracking Information about Business Component, Business Object, Repository Control Names and List Column names info and UI labels. This extra information is used to create guided navigation flows from the Process Steps. A BPA Adapter 1104 converts the recorded user events into an ordered series of steps (i.e., the process flows, such as the process flow of FIG. 4). It reads UPT files and generate process flows for the recorded user action streams. This automation framework is built on top of UPT and Open UI, with a set of UPT tracking enhancements that allows granular user clicks. A Process Adapter Driver maps the User Actions in the UPT files to the type of user action using JSON and converts into corresponding Key Words. It also keeps track of the Screens, Views and Applets on which the user action is performed. These scripts sort all data in the UPT logs into corresponding columns in the Process Flow (such as shown in FIG. 4).

An iHELP Converter Business Service 1106 is a guidance tool that delivers real-time assistance as a user navigates through the application.

In connection with service 1104, Business Process Automation starts when the Profile Attribute is set to Process or Both (Process and KWD). Once the profile attribute is set to Process, method "GenerateBPA" is invoked on the data in the UPT log (strUPTPath) which uses the JSON file for the mapping of the actions and keywords (strMapPath) which in turn invokes the Business Service "Process Discovery Service" for the Integration Object and Process Data mapping.

Once there is at least one Business Process generated, which means there was at least one UPT log, the Business Process Data is inserted in the Process Flow View applets by invoking the "EAI Siebel Adapter" Business Service. The following pseudo-code explains how and when the Business Process Flow starts and where the output of the Business Process will be saved:

```
if(strProfileAttr.CompareNoCase(SStext("Both")) == 0 || strProfileAttr.CompareNoCase(SStext("Process")) == 0)
{
        input.SetProperty(SStext("User ID"), strLoginName);
        input.SetProperty(SStext("MethodName"), SStext("GenerateBPA"));
        input.SetProperty(SStext("UPT Path"), strUPTPath);
        input.SetProperty(SStext("Map Path"), strMapPath);
        input.SetProperty(SStext("Log Path"), strLogPath);
        input.SetProperty(SStext("Automation Event Category"), SWE_CT_UPT_AUTOMATION_STR);
        input.SetProperty(SStext("Manual Event Category"), SWE_CT_UPT_MANUAL_STR);
        input.SetProperty(SStext("RecordingMode"),strProfileAttr);
        DOCHILD (m_pFrameMgr->GetModel( ), GetService (SSText("Process Discovery Service"), pPDService));
        DOCHILD (pPDService, InvokeMethod(SStext("doInvokeMethod"), input, output2));
        count = output2.GetChildCount( );
        if(count > 0)
```

```
{
    output2.GetProperty(SSText("NumberOfBPAFiles"),strNumBPAFiles);
    DOCHILD (m_pFrameMgr->GetModel( ), GetService(SStext("EAI Siebel Adapter"), pEAIService));
    DOCHILD (pEAIService, InvokeMethod(SStext("Insert"), output2, returnPropSet));
    //Refresh Process Applet
    pProcessFrame = m_pFrameMgr->GetSAApplet(pProcessApplet);
    if(pProcessFrame != NULL && pProcessFrame->m_pbcForm != NULL)
    {
        DOCHILD (pProcessFrame->m_pbcForm, Execute ( ));
        DOCHILD (pProcessFrame->m_pbcForm, Home( ));
    }
  }
}
```

Embodiments next define the column headers in the Business Process Flow under which the corresponding information will be filled later by reading the UPT logs as follows:

```
String strHeader = STR_SI_NO + CHAR_PIPE + STR_ACTION + CHAR_PIPE +STR_APPLICATION + CHAR_PIPE
+ STR_USER_NAME + CHAR_PIPE + STR_SCREEN + CHAR_PIPE + STR_VIEW + CHAR_PIPE +
STR_BULKINOUT_VIEWLEVEL + CHAR_PIPE + STR_APPLET + CHAR_PIPE + STR_CONTROL + CHAR_PIPE
+ STR_HEADER_END_ACTION + CHAR_PIPE + STR_ROW_NUMBER +CHAR_PIPE+ STR_INPUTS +
CHAR_PIPE +"Record ID"+ CHAR_PIPE +"Start Time" + CHAR_PIPE+"Business
Component"+CHAR_PIPE+STR_BUSINESS_OBJECT+CHAR_PIPE + "Control Label"+ CHAR_PIPE + "Process
Instance ID" + CHAR_PIPE + "Start Delimiter"+CHAR_PIPE + "End Delimiter"+CHAR_PIPE + "Process
Type"+STR_CR_LF;
```

Embodiments then read the tokens from the UPT. The first few lines are read until the first user sequence is found in the UPT log, and are used to fill the generic information (e.g. User Name, Application Name, etc.) in the Business Process Flow that will be common over the entire flow as follows:

```
Automation~|^Siebel Universal
Agent~|^0-1~|^slc06ujy13624209715822992~|^Application~|^Siebel Universal
Agent~|^Recording~|^Unit Mode~|^0#StartRecording~|^Recording~|^03/12/2018
10:18:45~|^~|^SADMIN~|^23078~|^BusObj:WebCallCenter Home
Automation~|^Siebel Universal
Agent~|^0-1~|^slc06ujy13624209715822992~|^Application~|^Siebel Universal
Agent~|^ViewDeactivated~|^Home Page View (WCC)~|^0#~|^RTE~|^03/12/2018
10:18:58~|^~|^SADMIN~|^23078~|^BusObj:WebCallCenter Home
Automation~|^Siebel Universal
Agent~|^0-1~|^slc06ujy13624209715822992~|^Application~|^Siebel Universal
Agent~|^ViewActivated~|^Opportunity Screen Homepage
View~|^0#~|^Recording~|^03/12/2018
10:18:59~|^~|^SADMIN~|^23078~|^BusObj:Opportunity
Home~|^UASEQ1:@0'0'8'0'EUA'3"StartTime'12/02/2018
10:18:58:723'CurrentScreen'Web Call Center Home Screen'CurrentView'Home Page View
(WCC)'ParentRN'SiebScreenTabs'CurrentRN'Opportunities
Screen'CurrentUN'Opportunities'OT'SiebScreen'Value"
```

All the strings before the user sequence are tokenized and put into a HashMap (m_mapUptRecord) such as shown in the below pseudo-code, with the tokens as the values. These values in the HashMap are later mapped to the required columns in the Process Flow based on the keys in the HashMap by discarding the unwanted information.

```
m_mapUptRecord.put("Event Category", strtokens[0]);
m_mapUptRecord.put("Application Name", strtokens[1]);
m_mapUptRecord.put("User Id", strtokens[2]);
m_mapUptRecord.put("Session Id", strtokens[3]);
m_mapUptRecord.put("Object Type", strtokens[4]);
m_mapUptRecord.put("Object Name", strtokens[5]);
m_mapUptRecord.put("Event Name", strtokens[6]);
m_mapUptRecord.put("Event Sub Name", strtokens[7]);
m_mapUptRecord.put("Event Context", strtokens[8]);
m_mapUptRecord.put("Event Source", strtokens[9]);
m_mapUptRecord.put("Event Start Dt", strtokens[10]);
m_mapUptRecord.put("Event End Dt", strtokens[11]);
m_mapUptRecord.put("Login", strtokens[12]);
m_mapUptRecord.put("Build Number", strtokens[13]);
```

Embodiments then separate the user sequence values as follows:

---

Automation~|^Siebel Universal Agent~|^0-1~|^slc06ujy13624209715822992~|^Applet~|^FINCORP Deal Account Pick Applet~|^PreInvokeMethod~|^PickRecord~|^0#~|^Recording~|^03/12/2018 10:19:34~|^~|^SADMIN~|^23078~|^BusObj:Opportunity~|^SWERowId:1-1~|^UASEQ2:@0'0'6'0'EUA'3"StartTime'12/02/2018 10:19:34:91'ParentRN'FINCORP Deal Account Pick Applet'CurrentRN'PopupQueryPick'CurrentUN'OK'OT'Button'Value"~|^UASEQ1:@0'0'8'0'EUA'3"StartTime'12/02/2018 10:19:30:459'ParentRN'FINCORP Deal Account Pick Applet'CurrentRN'Name'CurrentUN'Account'OT'JText'Value'A. K. Parker Inc.'rowid'1'status'readonly'~|^BusComp:Account
Automation~|^Siebel Universal Agent~|^0-1~|^slc06ujy13624209715822992~|^Applet~|^Opportunity List Applet~|^PreInvokeMethod~|^GetQuickPickInfo~|^0#~|^Recording~|^03/12/2018 10:20:06~|^~|^SADMIN~|^23078~|^BusObj:Opportunity~|^UASEQ3:@0'0'8'0'EUA'3"StartTime'12/02/2018 10:20:1:602'ParentRN'Opportunity List Applet'CurrentRN'TeamspaceExistenceState'CurrentUN'Team Space'OT'Link'Value'TeamspaceNone'rowid'1'status'readonly'~|^SWERowId:88-1XFNND~|^UASEQ2:@0'0'7'0'EUA'3"StartTime'12/02/2018 10:19:59:884'ParentRN'Opportunity List Applet'CurrentRN'Primary Revenue Win Probability'CurrentUN'Probability %'OT' JComboBox'Value'0%'rowid'1'~|^UASEQ1:@0'0'7'0'EUA'3"StartTime'12/02/2018 10:19:58:693'ParentRN'Opportunity List Applet'CurrentRN'Primary Revenue Amount'CurrentUN'Revenue'OT' JCurrencyCalc'Value'$100.00'rowid'1'~|^BusComp:Opportunity

---

Since there can be more than one user sequence in the UPT in a non-sequential manner, information in these user sequences are read in the sequential order of user sequence. All the data in these user sequences such as ParentRN, SWERowld, OT, etc., is extracted and maintained in another HashMap such as follows:

---

```
for(int j = 0; j<useq.size( );j++){
    Integer seqNum = useq.get(j);
    String uSeqKey = STR_UASEQ + seqNum.toString( );
    String[ ] strtokens = uptlog.get(i).get(uSeqKey).split(STR_GRAVE);
    HashMap<String,String> row = new HashMap<String,String>( );
    HashMap<String,String> selectRowSeq = new HashMap<String,String>( );
    for(int k= 0;k<strtokens.length; k++){
if(strtokens[k].equals(STR_ID)||strtokens[k].equals(STR_PARENTRN)||strtokens[k].equals(STR_Event)
||strtokens[k].equals(STR_CURRENTRN)||strtokens[k].equals(STR_OT)||strtokens[k].equals(STR_VALUE)||strtokens
[k].equals(STR_ROWID)||strtokens[k].equals(STR_OPERATION) || strtokens[k].equals(STR_VIEWLEVEL) ||
strtokens[k].equals(STR_CLASS) || strtokens[k].equals(STR_STATUS) || strtokens[k].equals(STR_TYPE) ||
strtokens[k].equals(STR_RECORD_ID) || strtokens[k].equals(STR_CURRENT_VIEW) ||
strtokens[k].equals(STR_CURRENT_SCREEN) || strtokens[k].equals(STR_CURRENTUN)){
            if(k+1 < strtokens.length){
                row.put(strtokens[k], strtokens[k+1]);
            }
            else{
                row.put(strtokens[k], "");
            }
        }
    }
}
```

---

Embodiments then modify all the values in this HashMap either depending on the other values or the combination of the values in the HashMap. For example: View name in the Flow is modified depending on the value of the STR_Event_Name, STR_Event_Sub_Name and STR_OT as follows:

---

```
if(uptlog.get(i).get(STR_Event_Name).equalsIgnoreCase(STR_VIEW_ACTIVATED)) {
        if(((uptlog.get(i).get(STR_Event_Sub_Name)).equalsIgnoreCase(cView)) ||
((uptlog.get(i).get(STR_Event_Sub_Name)).equalsIgnoreCase(CURRENTRN))) {
            track_screen = cScreen;
        }
        else if(row.containsKey(STR_OT) && OT.equalsIgnoreCase("SiebWebSitemapView")) {
            track_screen = row.get(STR_PARENTRN);
        }
        else {
            track_screen = CURRENTRN;
        }
        track_view = uptlog.get(i).get(STR_Event_Sub_Name);
    }
    else {
        if(cView !=null && !cView.isEmpty( )){
```

```
            track_view = cView;
        }
        if(cScreen !=null && !cScreen.isEmpty( )){
                track_screen = cScreen;
            }
        }
        row.put(STR_VIEW, track_view);
        row.put(STR_SCREEN, track_screen);
```

Embodiments then modify all the tokenized strings and the extracted user sequence information stored in HashMaps as required by reading the JSON and are combined into an ArrayList of HashMap to create the Siebel PropertySet by mapping all the data in the ArrayList of HashMap to the Integration Component fields of the Integration Object "Process Data" and to create a Siebel Propertyset which is inserted in the Process Flow View applets by invoking the "EAI Siebel Adapter" Business Service as follows:

```
SiebelPropertySet siebelMsg = new SiebelPropertySet( );
    siebelMsg.setType("SiebelMessage");
    siebelMsg.setProperty("MessageId","");
    siebelMsg.setProperty("MessageType","Integration Object");
    siebelMsg.setProperty("IntObjectName","Process Data");
    siebelMsg.setProperty("IntObjectFormat","Siebel Hierarchical");
    SiebelPropertySet listOfProcessData = new SiebelPropertySet( );
    listOfProcessData.setType("ListOfProcess Data");
    String[ ] properties = {"Seq Num","View","Applet","Inputs","Screen","Action","Application","User
ID","Control","Row Number","Business Compenent","Business Object","Choice of Closing Action","Event Start
Dt","View Level","Record Id","Control Display Name"};
    for (HashMap.Entry<String, ArrayList<HashMap<String, String>>> entry : records.entrySet( )) {
        String procKey = entry.getKey( );
        SiebelPropertySet processDetails = new SiebelPropertySet( );
        processDetails.setType("Process Details");
        processDetails.setProperty("Process Name",procKey);
        ArrayList<HashMap<String, String>> processList = new ArrayList<HashMap<String,
String>>(entry.getValue( ));
        SiebelPropertySet listOfProcessSteps = new SiebelPropertySet( );
        listOfProcessSteps.setType("ListOfProcess Steps");
        for(int i = 0; i<processList.size( ); i++){
            SiebelPropertySet processSteps = new SiebelPropertySet( );
            processSteps.setType("Process Steps");
            HashMap<String, String> stepProps = new HashMap<String, String>(processList.get(i));
            for(String strKey: properties){
                if(strKey.equalsIgnoreCase("Business Compenent")){
                    processSteps.setProperty("BusComp
Name",(stepProps.get(strKey)!=null)?stepProps.get(strKey):"");
                }
                else if(strKey.equalsIgnoreCase("Business Object")){
                    processSteps.setProperty("BusObj Name",(stepProps.get(strKey)!=null)?stepProps.get(strKey):"");
                }
                else if(strKey.equalsIgnoreCase("User ID")){
                    processSteps.setProperty("User Login",(stepProps.get(strKey)!=null)?stepProps.get(strKey):"");
                }
                else if(strKey.equalsIgnoreCase("Choice of Closing Action")){
                    processSteps.setProperty("End Action",(stepProps.get(strKey)!=null)?stepProps.get(strKey):"");
                }
                else if(stepProps.containsKey(strKey)){
                    if(stepProps.get(strKey)!=null && stepProps.get(strKey).equalsIgnoreCase("NULL")){
                        stepProps.put(strKey,"");
                    }
                    processSteps.setProperty(strKey,(stepProps.get(strKey)!=null)?stepProps.get(strKey):"");
                }
                else{
                    processSteps.setProperty(strKey,"");
                }
            }
            listOfProcessSteps.addChild(processSteps);
        }
        processDetails.addChild(listOfProcessSteps);
        listOfProcessData.addChild(processDetails);
    }
    siebelMsg.addChild(listOfProcessData);
    return siebelMsg;
```

All the user actions in the UPT log are then mapped to keywords and this mapping is maintained in the JSON file. Each keyword can be mapped to one or more user actions. Once a user action is found in the UPT log, the corresponding mapped keyword is picked from the JSON and put into the Action column of the Business Process Flow.

For example, User Action "SelectRow" is mapped to the keyword "SelectRecordinListApplet" while the User Actions "SiebWebSitemapScreen,SiebWebSitemapView,SiebWebScreenSubViewTab, SiebScreen,SiebViewLink, SiebVisListItem,SiebJumpTab" are mapped to the keyword "GoToView"

JSON also takes care of mapping the UPT data into other Business Process Columns for each keyword. When the user action "SelectRow" is found in the UPT log, information in the corresponding UPT data sequence is used to fill the other Business Process Flow columns such as shown below for the keyword "SelectRecordinListApplet".

```
Example: "SelectRecordinListApplet": {
    "Inputs": "Value/Variable",
    "Applet": "AppletRN",
    "Control": "ItemRN",
    "Row Number": "rowid",
    "Control Display Name": "CurrentUN"
}
```

As disclosed, the output from Process Discoverer can be used for multiple use cases:
1. Automated generation of navigation flows;
2. Using Machine Learning to manage deviations
Guided Navigation Flows In Siebel CRM, the navigational flows are categorized under iHelp. From the Process Flow view, user can, with a single click of the button, convert a process into a navigational flow (iHelp in Siebel CRM).

Figure 12:
FIG. 12 is a screenshot of an iHelp UI in accordance to embodiments.

FIG. 12 is a screenshot of an iHelp UI in accordance to embodiments. As shown, the expert records the Opportunity creation standard process that is followed in the organization. The process is then made available as a Navigation flow (iHelp) in the left pane 1201 where users can click and the system takes the user to that particular entity.

The engine highlights the actionable objects (buttons, fields, labels) so that users who are not well versed with the system can locate the objects. Users are allowed to override the steps and take decisions. The UPT tool can be enabled in the back-end to track the user actions. The data can be recorded for Compliance, Training and Automation opportunities:
  Identify the needs for User Training—At Individual/Group/Organization level.
  The data provides the inputs in discovering the opportunities for Process Streamlining and Process Automation.
  Find the points in the Standard Operating Procedures where users diverted and overrode the SOP.

As disclosed above, embodiments can use machine learning to manage deviations. The tool starts with the expert suggested sequence of steps to execute a process flow. The user interactions are recorded over a period of time. Once enough data is captured from human interactions, the Machine Learning engine is used to identify the next best action whenever the user has taken a deviation.

For example, the engine can learn from the data that contact center agents, instead of entering data in the list view, open the opportunity and then enter all the information at once. The engine can also identify the sources of data and then can automate the data entry process.

Several embodiments are specifically illustrated and/or described herein. However, it will be appreciated that modifications and variations of the disclosed embodiments are covered by the above teachings and within the purview of the appended claims without departing from the spirit and intended scope of the disclosure.

What is claimed is:

1. A method for performing an automated process flow using machine learning, the method comprising:
    training, by a processor, a machine learning component using training data that represents past past interactions by one or more users with a customer relationship management (CRM) application when performing a plurality of past process flows, wherein each past process flow comprises a training series of tasks in a training sequence, the training data comprising a series of user interaction events and corresponding target objects and inputs;
    receiving data from a first user related to tasks within the CRM application, the data corresponding to a first process flow and identifying a service request of the CRM application;
    predicting, by the processor, using the trained machine learning component, a predicted series of a plurality of tasks and a predicted sequence for the predicted series of the plurality of tasks based on the received data; and
    automatically, by the processor, without human intervention, performing the predicted series of the plurality of tasks in the predicted sequence, the automatically performing causing the first process flow and service request to be completed.

2. The method of claim 1, further comprising:
    predicting, using the machine learning component, an input for at least one of the predicted series of tasks, wherein performing the one predicted task includes changing data in a database based on the input.

3. The method of claim 2, further comprising:
    predicting, using the machine learning component, a source for the input that is used to perform the database change.

4. The method of claim 3, wherein performing the database change includes retrieving data from the source and storing the retrieved data in the database.

5. The method of claim 4, further comprising:
    determining correlations between a set of data, from the training data generated through a plurality of iterations of a given process flow, and columns of a database, wherein the set of data comprises a data item related to the process flow that has a variance that meets a criteria over the plurality of iterations; and
    predicting the source based on the determined correlations.

6. The method of claim 5, wherein the predicted source comprises a column of the database with a highest determined correlation from among the correlated columns.

7. The method of claim 1, wherein each of the plurality of past process flows comprises a classification and a series of click streams that are captured based on usage pattern tracking.

8. The method of claim 7, wherein predicting the series of tasks and the sequence for the predicted series of tasks further comprises predicting a classification for a process flow based on the received data.

9. The method of claim 1, wherein the training data comprises a database for the CRM application.

10. The method of claim 9, wherein the training data comprises a log of the one or more users past interactions with the CRM application when performing a plurality of process flows.

11. The method of claim 10, wherein the log includes actions, targets, and inputs related to the one or more users past interactions with the CRM application when performing the plurality of process flows.

12. The method of claim 11, further comprising:
generating a plurality of first rules that associate actions with a set of targets from the log; and
generating a plurality of second rules that associate the set of targets with inputs from the log.

13. The method of claim 12, wherein predicting the series of tasks and the sequence for the predicted series of tasks is based on the first rules and the second rules.

14. The method of claim 9, wherein the training data is pre-processed to remove null values and duplicates.

15. A non-transitory computer-readable medium storing instructions which, when executed by at least one of a plurality of processors, cause the processor to automate a process flow using machine learning, the automation comprising:
training a machine learning component using training data that represents past interactions by one or more users with a customer relationship management (CRM) application when performing a plurality of past process flows, wherein each past process flow comprises a training series of tasks in a training sequence, the training data comprising a series of user interaction events and corresponding target objects and inputs;
receiving data from a first user related to tasks within the CRM application, the data corresponding to a first process flow and identifying a service request of the CRM application;
predicting, using the trained machine learning component, a predicted series of a plurality of tasks and a predicted sequence for the predicted series of the plurality of tasks based on the received data; and
automatically, without human intervention, performing the predicted series of the plurality of tasks in the predicted sequence, the automatically performing causing the first process flow and service request to be completed.

16. The non-transitory computer-readable medium of claim 15, the automation further comprising:
predicting, using the machine learning component, an input for at least one of the predicted series of tasks, wherein performing the one predicted task includes changing data in a database based on the input.

17. The non-transitory computer-readable medium of claim 16, the automation further comprising:
predicting, using the machine learning component, a source for the input that is used to perform the database change.

18. The non-transitory computer-readable medium of claim 17, wherein performing the database change includes retrieving data from the source and storing the retrieved data in the database, the automation further comprising:
determining correlations between a set of data, from the training data generated through a plurality of iterations of a given process flow, and columns of a database, wherein the set of data comprises a data item related to the process flow that has a variance that meets a criteria over the plurality of iterations; and
predicting the source based on the determined correlations.

19. A process flow automation system comprising:
a processor;
a storage device coupled to the processor and storing instructions that are executed by the processor to cause the processor to:
train a machine learning component using training data that represents past interactions by one or more users with a customer relationship management (CRM) application when performing a plurality of past process flows, wherein each past process flow comprises a training series of tasks in a training sequence, the training data comprising a series of user interaction events and corresponding target objects and inputs;
receive data from a first user related to tasks within the CRM application, the data corresponding to a first process flow and identifying a service request of the CRM application;
predict, using the trained machine learning component, a predicted series of a plurality of tasks and a predicted sequence for the predicted series of the plurality of tasks based on the received data; and
automatically, without human intervention, perform the predicted series of the plurality of tasks in the predicted sequence, the automatically performing causing the first process flow and service request to be completed.

20. The method of claim 1, wherein the service request comprises generating a ticket for interfacing with the CRM application.

* * * * *